US009185026B2

(12) United States Patent
Kumar et al.

(10) Patent No.: US 9,185,026 B2
(45) Date of Patent: Nov. 10, 2015

(54) TAGGING AND SYNCHRONIZATION FOR FAIRNESS IN NOC INTERCONNECTS

(71) Applicants: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, San Jose, CA (US)

(72) Inventors: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 286 days.

(21) Appl. No.: 13/723,882

(22) Filed: Dec. 21, 2012

(65) Prior Publication Data

US 2014/0177648 A1    Jun. 26, 2014

(51) Int. Cl.
*H04L 12/721*    (2013.01)
*H04L 12/851*    (2013.01)
*H04L 12/933*    (2013.01)
*H04L 12/947*    (2013.01)

(52) U.S. Cl.
CPC ............... *H04L 45/44* (2013.01); *H04L 47/24* (2013.01); *H04L 49/109* (2013.01); *H04L 49/25* (2013.01)

(58) Field of Classification Search
None
See application file for complete search history.

(56) References Cited

U.S. PATENT DOCUMENTS

| | | | |
|---|---|---|---|
| 5,432,785 A | 7/1995 | Ahmed et al. | |
| 5,764,740 A | 6/1998 | Holender | |
| 5,991,308 A | 11/1999 | Fuhrmann et al. | |
| 6,003,029 A | 12/1999 | Agrawal et al. | |
| 6,249,902 B1 | 6/2001 | Igusa et al. | |
| 6,415,282 B1 | 7/2002 | Mukherjea et al. | |
| 6,925,627 B1 | 8/2005 | Longway et al. | |
| 6,967,926 B1 * | 11/2005 | Williams et al. | 370/236 |
| 7,065,730 B2 | 6/2006 | Alpert et al. | |
| 7,318,214 B1 | 1/2008 | Prasad et al. | |
| 7,590,959 B2 | 9/2009 | Tanaka | |
| 7,725,859 B1 | 5/2010 | Lenahan et al. | |
| 7,808,968 B1 | 10/2010 | Kalmanek, Jr. et al. | |
| 7,917,885 B2 | 3/2011 | Becker | |
| 8,050,256 B1 | 11/2011 | Bao et al. | |

(Continued)

FOREIGN PATENT DOCUMENTS

CN    103684961 A    3/2014
WO    2014059024 A1    4/2014

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Diane Lo
(74) *Attorney, Agent, or Firm* — Procopio, Cory, Hargreaves & Savitch LLP

(57) ABSTRACT

Systems and methods described herein are directed to solutions for NoC interconnects that provide end-to-end uniform- and weighted-fair allocation of resource bandwidths among various contenders. The example implementations are fully distributed and involve tagging the messages with meta-information when the messages are injected in the interconnection network. Example implementations may involve routers using various arbitration phases, and making local arbitration decisions based on the meta-information of incoming messages. The meta-information can be of various types based on the number of router arbitration phases, and the desired level of sophistication.

17 Claims, 11 Drawing Sheets

(56) References Cited

U.S. PATENT DOCUMENTS

| | | |
|---|---|---|
| 8,059,551 B2 | 11/2011 | Milliken |
| 8,099,757 B2 | 1/2012 | Riedle et al. |
| 8,136,071 B2 | 3/2012 | Solomon |
| 8,281,297 B2 | 10/2012 | Dasu et al. |
| 8,312,402 B1 | 11/2012 | Okhmatovski et al. |
| 8,448,102 B2 | 5/2013 | Kornachuk et al. |
| 8,492,886 B2 | 7/2013 | Or-Bach et al. |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,635,577 B2 | 1/2014 | Kazda et al. |
| 8,667,439 B1 | 3/2014 | Kumar et al. |
| 8,717,875 B2 | 5/2014 | Bejerano et al. |
| 2002/0071392 A1 | 6/2002 | Grover et al. |
| 2002/0073380 A1 | 6/2002 | Cooke et al. |
| 2002/0095430 A1 | 7/2002 | Egilsson et al. |
| 2004/0216072 A1 | 10/2004 | Alpert et al. |
| 2005/0147081 A1 | 7/2005 | Acharya et al. |
| 2006/0161875 A1 | 7/2006 | Rhee |
| 2007/0118320 A1 | 5/2007 | Luo et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2008/0072182 A1 | 3/2008 | He et al. |
| 2008/0120129 A1 | 5/2008 | Seubert et al. |
| 2009/0070726 A1 | 3/2009 | Mehrotra et al. |
| 2009/0268677 A1 | 10/2009 | Chou et al. |
| 2009/0313592 A1 | 12/2009 | Murali et al. |
| 2010/0040162 A1 | 2/2010 | Suehiro |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0154282 A1 | 6/2011 | Chang et al. |
| 2011/0276937 A1 | 11/2011 | Waller |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0110541 A1 | 5/2012 | Ge et al. |
| 2012/0155250 A1 | 6/2012 | Carney et al. |
| 2013/0051397 A1 | 2/2013 | Guo et al. |
| 2013/0080073 A1 | 3/2013 | de Corral |
| 2013/0103369 A1 | 4/2013 | Huynh et al. |
| 2013/0151215 A1 | 6/2013 | Mustapha |
| 2013/0159944 A1 | 6/2013 | Uno et al. |
| 2013/0174113 A1 | 7/2013 | Lecler et al. |
| 2013/0207801 A1 | 8/2013 | Barnes |
| 2013/0219148 A1 | 8/2013 | Chen et al. |
| 2013/0263068 A1 | 10/2013 | Cho et al. |
| 2013/0326458 A1 | 12/2013 | Kazda et al. |
| 2014/0050221 A1* | 2/2014 | Locatelli et al. ............. 370/394 |
| 2014/0068132 A1 | 3/2014 | Philip et al. |
| 2014/0092740 A1 | 4/2014 | Wang et al. |
| 2014/0098683 A1 | 4/2014 | Kumar et al. |
| 2014/0115218 A1 | 4/2014 | Philip et al. |
| 2014/0115298 A1 | 4/2014 | Philip et al. |
| 2014/0241443 A1* | 8/2014 | Nowick et al. ............. 375/259 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E. et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, December Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

TAGGING AND SYNCHRONIZATION FOR FAIRNESS IN NOC INTERCONNECTS

BACKGROUND

1. Technical Field

Methods and example implementations described herein are generally directed to interconnect architecture, and more specifically, to Network on Chip (NoC) system interconnect architecture.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both systems the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several possible topologies in which the routers can connect to one another to create the system network. Bi-directional rings (as shown in FIG. 1(a)) and 2-D (two dimensional) mesh (as shown in FIG. 1(b)) are examples of topologies in the related art. Mesh can also be extended to 2.5-D (two and half dimensional) or 3-D (three dimensional) organizations.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may be simple to implement in hardware, maintains packet ordering and may be easy to render free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until it reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until it reaches the final destination router. Dimension ordered routing is often minimal turn and shortest path routing.

FIG. 2 pictorially illustrates an example of XY routing in a two dimensional mesh. More specifically, FIG. 2 illustrates XY routing from node '34' to node '00'. In the example of FIG. 2, each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects often employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. During congestion, when multiple sources transmit messages to the same destination, their messages may contend with each other and with the cross-traffic for the bandwidth. Therefore, the effective destination bandwidth received by each source will depend on their positions in the network, how their routes overlap with each other, cross-traffic along their routes to the destination, and the arbitration policies deployed at various routers where arbitration is needed. In spite of uniformly fair arbitration policies at all routers, depending on location of various sources there may be a substantial difference in the destination bandwidth received.

Consider a section of a NoC interconnect shown in FIG. 3, wherein four components (source 1, source 2, source 3, and source 4) transmit messages to one component (destination). In this example, the maximum data transmit bandwidth of the four source components is equal to the maximum data receive bandwidth of the destination component. Each of the five components are connected to a local router node, and the router nodes are connected with each other using point to point channels as shown in FIG. 3. In the example of FIG. 3, each of the channels have a receive bandwidth of the destination component equal to a transmit bandwidth of the source component.

In the system shown in FIG. 3, if all four source components attempt to transmit data at their peak transmit rate and if the destination component is ready to accept data at its peak receive rate, then messages from the four source components will contend with each other within the NoC interconnect.

In FIG. 4, the routers and components are separated for clarity the channels that connect components with their local routers are illustrated.

At router 41 in FIG. 4, messages arriving at the left input port (e.g., from router 42) and the bottom input port (e.g., from source 4) will contend for the right output port (e.g., to router 40). If routers implement uniformly fair arbitration policy to arbitrate between incoming messages at different input ports contending for an output port, then the output port's bandwidth will be equally split between the two input ports as shown. Each input port will receive 50% of the destination bandwidth—source 4 therefore will receive half of the destination bandwidth.

At router 42 in FIG. 4, messages arriving at the left input port (e.g. from router 43) and bottom input port (e.g., from source 3) will contend for the right output port. If routers implement uniformly fair arbitration policy to arbitrate between incoming messages at different input ports contending for an output port, then the 50% output port's bandwidth (computed in the above step) will be equally split between the two input ports as shown. Each input port will receive 25% of the destination bandwidth—source 3 therefore will receive a quarter of the destination bandwidth.

At router 43 in FIG. 4, messages arriving at the left input port (e.g., from router 44) and bottom input port (e.g., from source 2) will contend for the right output port (e.g., to router 42). If routers implement uniformly fair arbitration policy to arbitrate between incoming messages at different input ports contending for an output port, then the 25% output port's bandwidth (computed in the above step) will be equally split between the two input ports as shown. Each input port will receive 12.5% of the destination bandwidth—source 2 therefore will receive 12.5% of the destination bandwidth. The remaining 12.5% bandwidth will be received by source 1.

The example of FIG. 4 illustrates that even though each router employs a uniformly fair arbitration policy wherein the router gives fair share of output port bandwidth among all input port contenders, the four sources receive vastly different shares of the destination bandwidth. In a complex network with additional cross-traffic, the bandwidth allocated to various source components when they content for various destinations may vary substantially. This may be undesirable in many applications, wherein fair or equal allocation of various resources among all contenders may be important to achieve a high system performance. In many systems, weighted allocation is desired, so that the various resource bandwidths are allocated among various contenders in a pre-specified ratio.

There are several techniques in the related art to provide uniform or weighted fair arbitration within a single router, wherein the output port bandwidth is allocated to contending input ports based on the weight specification. Weighted round-robin, deficit round-robin, weighted fair queuing, etc. are a few techniques that are used in the related art. Guaranteeing weighted- or uniform-allocation of various resources among contenders in a distributed NoC interconnect with resources and contenders connected at arbitrary positions in the NoC interconnect is challenging. A few techniques that are used in the related art are described below.

Rate limiting the sources: Each source contending for a resource destination is allowed to send data at a pre-specified rate based on its fair share. This technique is independent of the state of other sources, whether the other sources are contending for the resource or not. Therefore, based upon the pre-specified rates of sources, rate limiting of the sources can either lead to under-utilization of resource bandwidth, or unfair allocation.

Configure router port weights: Based on the traffic merging characteristics, various ports of the routers along the path from various sources to the resource destination are assigned a weight. The weight is used for local arbitration at the router. If all sources are participating, then the configuration of router port weights can provide fair allocation. However when several sources are not contending for the resource, then unfair allocation may occur.

Age based arbitration: Every message injected by various components carries timestamp information, which describes the age of the message. Within the NoC interconnect, routers give higher preference to older messages over newer messages, whenever multiple messages content for an output port. This technique can provide end-to-end uniform fairness, however it is unable to provide weighted fairness. Furthermore, age based arbitration comes at a high implementation cost of additional bits needed to carry the age information and complex circuitry at every router to determine the oldest message.

SUMMARY

Aspects of the present application include a method, which may involve associating a tag with one or more packets of at least one input channel of a network on chip (NoC), the tag having information for one or more arbitration decisions; reading the information of the tag; and conducting an arbitration of the one or more packets for an output channel based on the reading of the information.

Aspects of the present application include a computer readable storage medium storing instructions for executing a process. The process may involve associating a tag with one or more packets of at least one input channel of a network on chip (NoC), the tag having information for one or more arbitration decisions; reading the information of the tag; and conducting an arbitration of the one or more packets for an output channel based on the reading of the information.

Aspects of the present application include a system, which may involve a tagging module associating a tag with one or more packets of at least one input channel of a network on chip (NoC), the tag having information for one or more arbitration decisions; and a router module reading the information of the tag and conducting an arbitration of the one or more packets for an output channel based on the reading of the information.

DETAILED DESCRIPTION

In a distributed NoC interconnect connecting various resources and components with each other using multiple routers and point to point links between the routers, unfair allocation of resource bandwidth may occur to various contenders depending upon their locations in the NoC interconnect, despite every router performing a fair arbitration locally among its input ports contending for an output port. Standard fairness algorithms in such settings are either unable to provide end-to-end fairness, or may be too expensive to implement.

Example implementations described herein are directed to solutions for 2-D, 2.5-D and 3-D NoC interconnects that provide end-to-end uniform-fair and weighted-fair allocation of resource bandwidths among various contenders. The example implementations are fully distributed and involve tagging the messages with meta-information when the messages injected in the interconnection network.

Example implementations further involve routers using various arbitration phases, and making local arbitration decisions based on the meta-information of incoming messages. The meta-information can be of various types based on the number of router arbitration phases, and the desired level of sophistication. An example wherein two arbitration phases (normal and barrier) are used is also disclosed, in which case a single additional tag bit in the message may be required, and the localized arbitration logic at routers may also be minimal.

Example implementations of utilizing the uniform-fair allocation solution using two tags and two arbitration phases are described below. Messages are tagged at the source node during injection to the NoC interconnect to indicate whether they are a barrier message or a normal message. Tagging may be performed by either by the source component itself, or an intermediate logic function sitting between the source component and the NoC interconnect (i.e., the local router of the NoC connected directly to the source). If messages are broken into packets and flits, then every flit may be tagged with barrier or normal tag based upon the packet, the message, the flit sizes, and the system requirements. The term 'packet' as described herein refers to packets, flits, messages or phits (e.g. if a flit is sub-divided into phits for transfer over multiple cycles) interchangeably.

The tagging unit at source component tags packets such that there is one barrier packet for every P normal packets. P is a system parameter that may be determined based on the NoC interconnect properties such as longest route path, latency, congestion levels, number of components, etc.

Figure 1A:
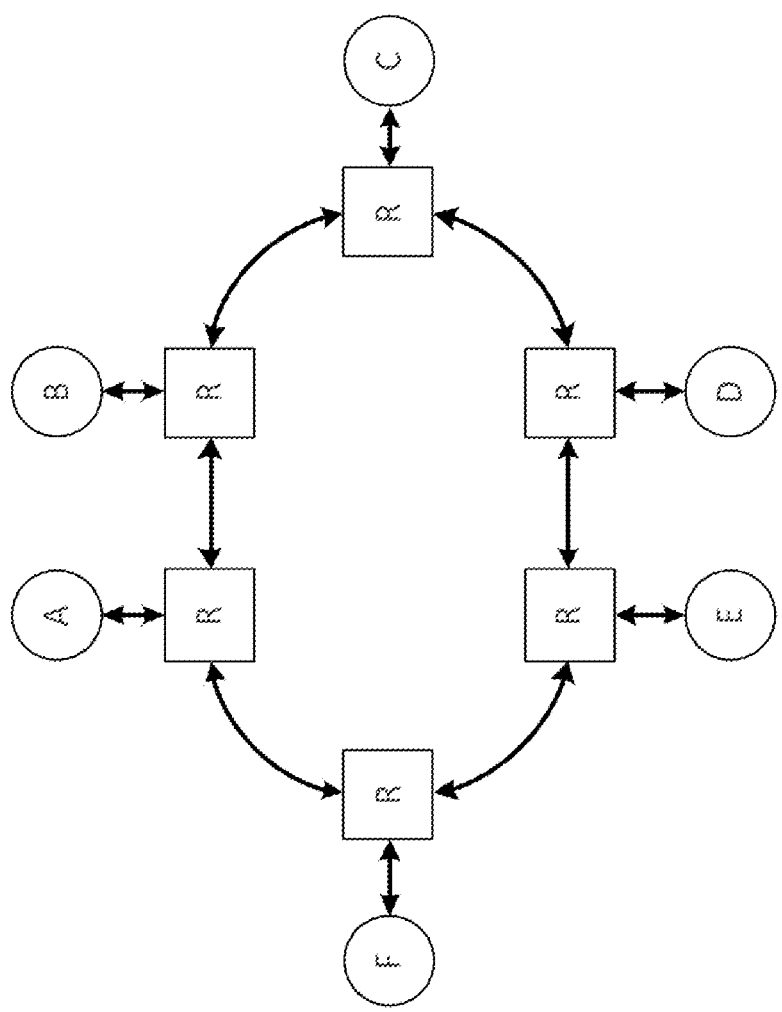
FIGS. 1(a) and 1(b) illustrate examples of Bidirectional ring and 2D Mesh NoC Topologies.
Figure 1B:
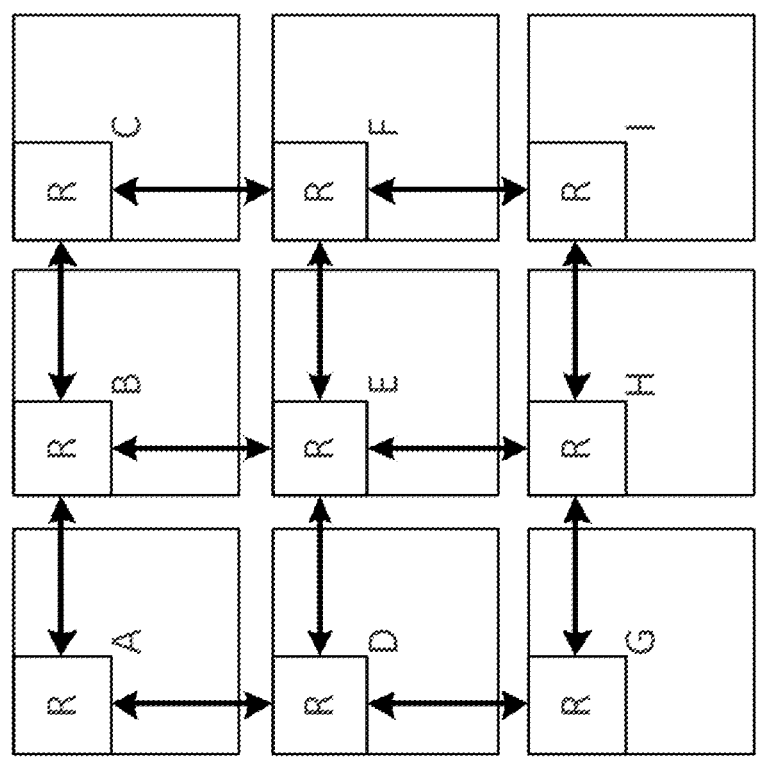
Figure 2:
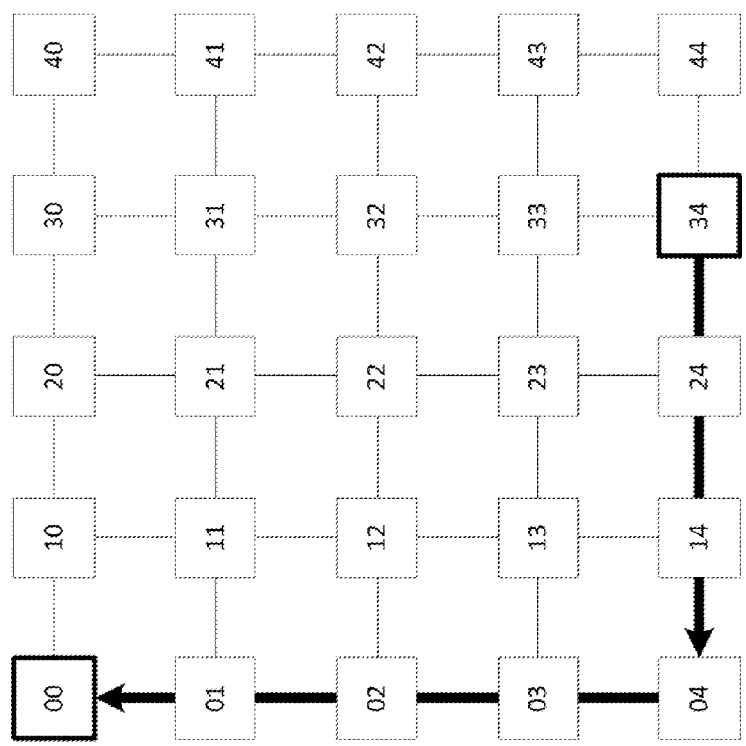
FIG. 2 illustrates an example of XY routing in a related art two dimensional mesh.
Figure 3:
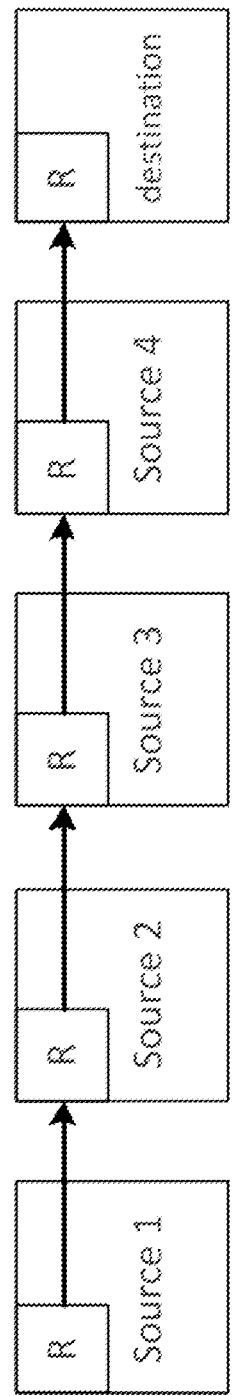
FIG. 3 illustrates an example of a NoC interconnect.
Figure 4:
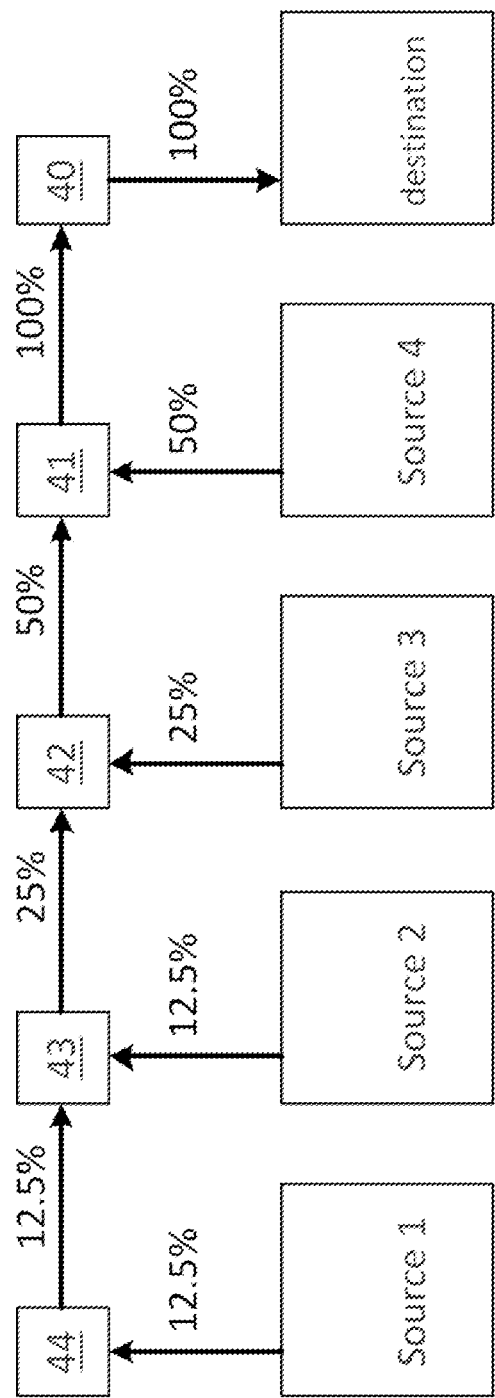
FIG. 4 illustrates a NoC interconnect with routers and interconnects separated for clarity.
Figure 5:
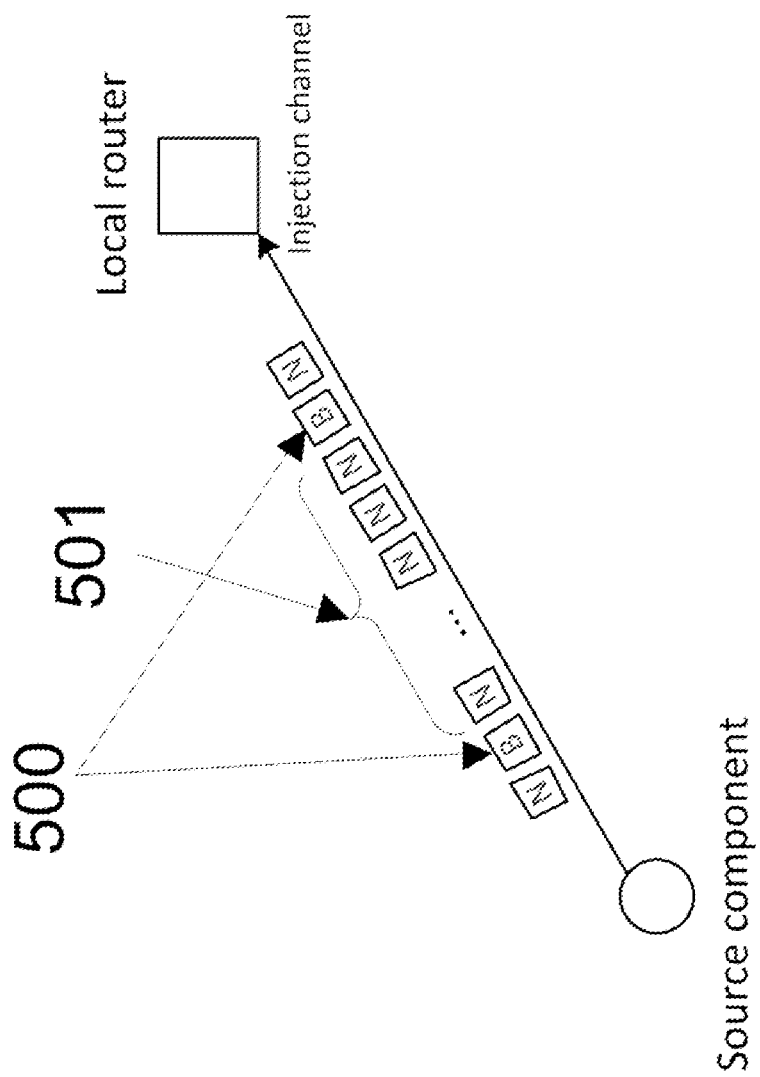
FIG. 5 illustrates an example implementation involving a normal packet and a barrier packet.

FIG. 5 illustrates an example implementation involving normal packets and barrier packets. Here B represents a barrier packet (500) and N represents a normal packet (501). As packets are injected into the network by the source component (transmitted to the local router at which the source component is directly connected to), a packet is tagged as a barrier packet 500 every time after a continuous sequence P normal packets.

When packets reach the input channel of various NoC routers, based on their tag value which specifies whether they are barrier or normal packets, the packets are processed and arbitrated for the output channel differently. The output channels of the router are assigned to a unique group. There may be multiple groups up to the total number of output channels in the router. The groups are assigned with an arbitration phase value which is managed within the router. The phase of an output channel is same as the phase of the group the output channel belongs to. There are at least two arbitration phase values. In a normal arbitration phase, only normal packets contending for the output channel are permitted to be transmitted on the output channel, while in a barrier arbitration phase only barrier packets contending for the output channel are permitted to be transmitted on the output channel. To implement the dual arbitration, the router's arbitration logic may need to only allow those input packets to participate in the arbitration whose tag value matches the phase of the packet's desired output channel.

Figure 6:
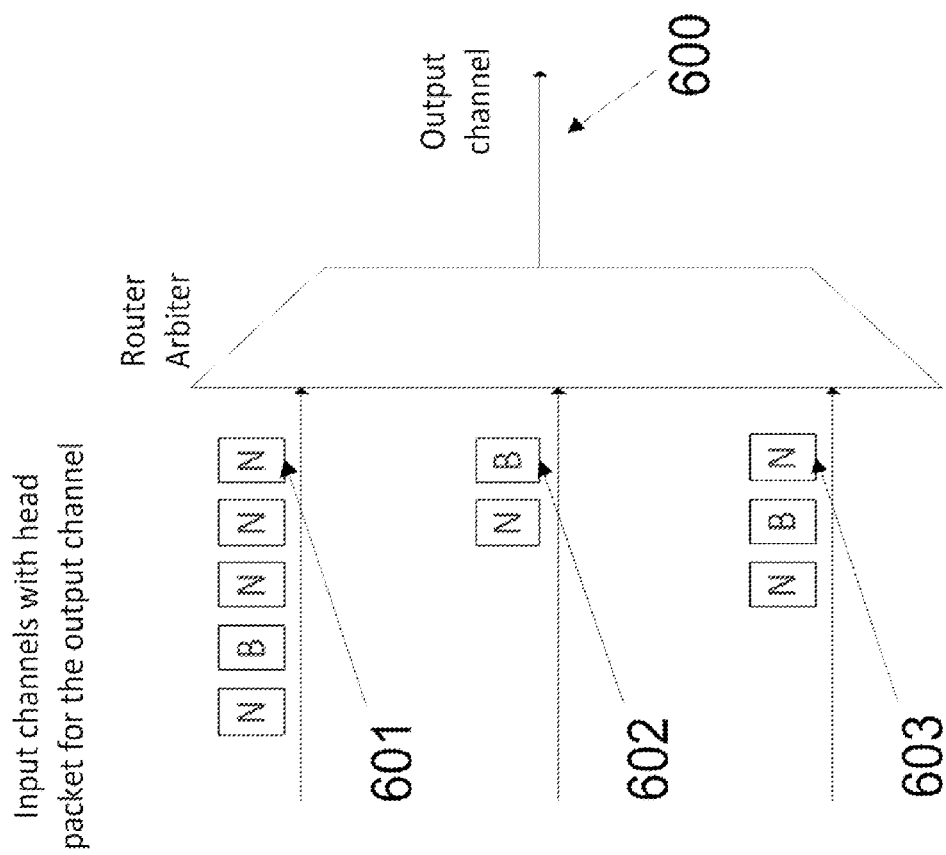
FIG. 6 illustrates a router's arbiter in accordance with an example implementation.

FIG. 6 illustrates a router's arbiter in accordance with an example implementation. The example of FIG. 6, illustrates a router's arbiter where multiple input channels contend for an output channel. The input channels are organized as FIFO (First In First Out) buffer, and the packet at FIFO head may only participate in the arbitration. In the example shown, the three input channel's head packets 601, 602 and 603 are contending for the output channel 600. If output channel 600 is in the normal arbitration phase (hereinafter referred to as 'normal phase'), the router will only let packets 601 and 603 to participate in the arbitration, and packet 602 will not be allowed to participate. If output channel 600 is in the barrier arbitration phase (hereinafter referred to as 'barrier phase'), the router will only let packet 602 participate in the arbitration, and packets 601 and 603 will not be allowed to participate.

The arbitration phase of an output channel may start at any value, (e.g., either normal phase or barrier phase). To change the phase of an output channel, the tag values of all packets at the head of all input channels that are contending for the output channel are examined. If the tag values of each of these packets are different from the phase of the output channel, then the output channel's phase is switched to match the tag of the input head packets. If there are no head packets contending for an output channel then it is recommended that the channel's phase may not undergo a change.

Described here is an example of phase switching. Consider the example shown in FIG. 6, wherein head packets of three input channels contend for the output channel 600. For the example of phase switching, assume that the output channel 600 was in the barrier phase, and packet 602 participated in the arbitration and won and got transmitted. The packet behind 602 is a normal packet also contending for the same output channel 600. Assuming that no other head packet at any input channel is contending for output channel 600, the new state of the various channels is shown in FIG. 7.

Figure 7:
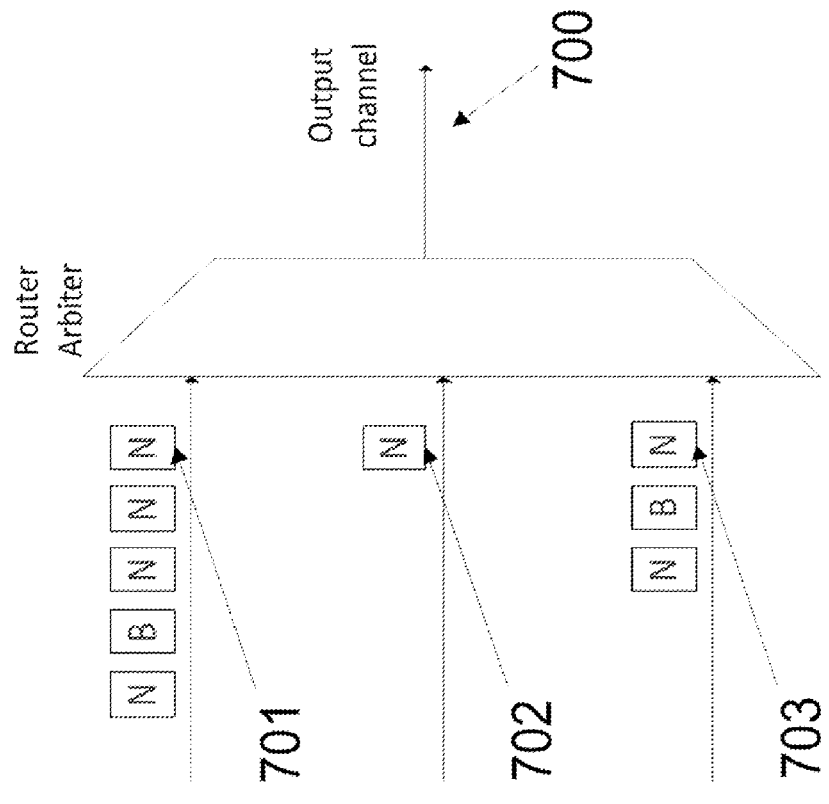
FIG. 7 illustrates a router's arbiter with phase switching in accordance with an example implementation.

FIG. 7 illustrates a router's arbiter with phase switching in accordance with an example implementation. In the example of FIG. 7, output channel 700 is in the barrier phase, and all the input channel's head packets contending for the output channel 700 are in normal phase, so none can be allowed to participate in arbitration. At this point, the phase of the output channel 700 can therefore be switched from the barrier phase to the normal phase.

In an additional implementation, not only the head packets of various input channels are examined to update the output channel's phase, but all of the packets at all of the input channels buffers that are contending for the output channel are examined. In such designs, out-of-order reads and transmission of packets from various input channel buffers may need to be allowed, as they may no longer operate as a FIFO.

Example implementations of tagging packets and the updated router arbitration based on output channel phases may provide end-to-end fairness. FIG. 8 illustrates a NoC interconnect system, in accordance with an example implementation. There are three source nodes connected to their local routers 81, 82 and 83, and a destination node connected to router 80. The routers 80, 81, 82, and 83 are connected using point to point links as illustrated in FIG. 8. Assume that every router implements barrier-normal two phase arbitration, and every source repeatedly tags two packets as normal followed by a barrier packet.

Figure 8A:
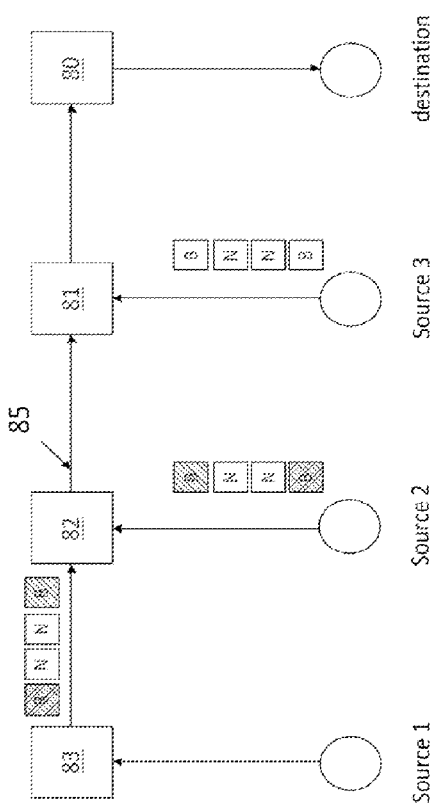
FIGS. 8(a) and 8(b) illustrate a NoC interconnect system, in accordance with an example implementation.

In FIG. 8(a), sources 1 and 2 transmits a sequence of tagged packets. Router 83 does not need to perform any arbitration as the flit from source 1 does not need to contend with any other flit in this example. However, at router 82, packets from source 1 and source 2 contends for the output channel 85 as shown.

Figure 8B:
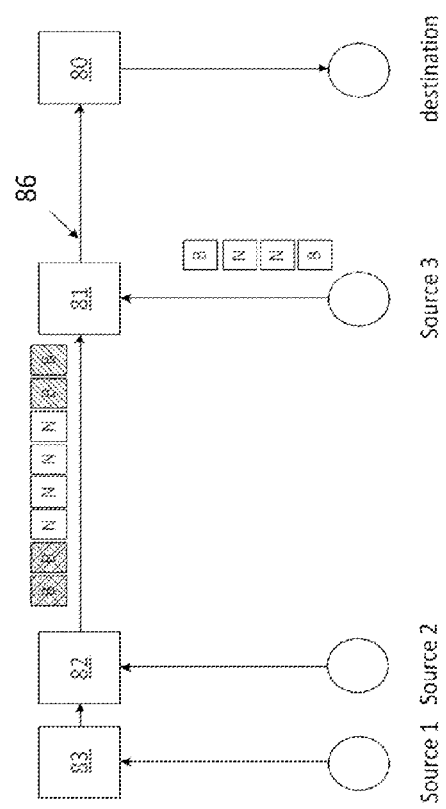

Initially, router 82 will see barrier packets from source 1 and 2 at the two input channels contending for output channel 85. The output channel changes to the barrier phase, if the output channel is not already in barrier phase. Then, the barrier packets are arbitrated for the output channel and eventually transmitted in some order based upon the arbitration outcome. Next, the two input channels of router 82 will see normal packets from source 1 and 2 contending for the output channel 85, therefore the output channel 85 changes to the normal phase. The four normal packets (two from source 1 and two from source 2) will be transmitted in some order at the output channel. Next, the phase changes back to the barrier phase and the subsequent barrier packets are transmitted. The resulting sequence of packets at the output channel 85 of router 82 is shown at FIG. 8(b). Here, there is a pattern of two barrier packets followed by four normal packets. Thus, the router synchronizes around the barrier packets and merges the barrier packets from each contending source into one longer sequence, and also merges the normal packets into another longer sequence at the output channel. During each such synchronization at router 82, source 1 and source 2 are able to send three packets each at output channel 85 (1 barrier and 2 normal), thereby allowing each source to receive equal and fair share of the output bandwidth.

At router 81, the sequence of two barrier packets and four normal packets from router 82 contend with the sequence of one barrier packet and two normal packets from source 3 for the output channel 86. Again with barrier synchronization, the two barrier packets merge with a single barrier packet at the output channel 86 to form a group of three barrier packets. Next the normal packets also merge, forming a group of six normal packets. During each merger of normal and barrier packets at router 81, source 1 will transmit 3 packets (2 normal and 1 barrier) for every six packets arriving from router 82 (4 normal and 2 barrier). Therefore, source 3 is allotted half of the total bandwidth received by source 1 and 2, while source 1 and source 2 receives an equal share of bandwidth due to the synchronization at router 82 earlier. Thus, sources 1, 2 and 3 receive an equal share of bandwidth at the destination despite having different distances in number of router hops from the destination.

The end-to-end fairness is achieved in this example implementation because each router 1) combines all incoming barrier packets into the longest possible continuous sequence of barrier packets at its output; with the normal packets similarly combined into the longest sequence of continuous normal packets, and 2) synchronizes around each continuous barrier sequence at all input channels, ensuring that each continuous sequence of barrier packets gets through to the output before the normal sequences behind them and vice-versa. The more source contenders there are upstream, the longer the barrier and normal packets sequence becomes as their traffic merges going towards the destination. Near the destination, a larger group of sources further away from the destination appear with longer continuous barrier and normal packet sequences compared to the smaller groups of sources. When these two traffic streams merge, the router synchronizes again around the barrier, and proportionally divides the bandwidth based upon the number of source contenders.

The disclosed example implementation for an arbitration scheme is highly distributed, can scale well with the increasing number of nodes in the NoC while providing end-to-end uniform fairness. The complexity involved to implement this scheme in every router is fairly modest as well.

Next, an extension of the scheme to provide end-to-end weighted fairness in addition to the uniform fairness is described below. Consider multiple sources at various places in the NoC contending for the bandwidth of a given destination node. The destination bandwidth needs to be divided among the sources based upon weight values assigned to each source. To achieve this property, an example implementation tags the packets transmitted from each source such that the number of normal packets between every two barrier packets given by some function of the weight is assigned to the source. A function may keep the number of normal packets between each of the barrier packets roughly proportional to the weight, or other functions may be utilized to manage the number of normal packets. Since the barrier sequences synchronizes in the NoC as various traffic contends with each other and merges, each source will be able to transmit a different number of packets after each synchronization step based upon the weights, thereby receiving a share of the bandwidth based on the weights.

The above example implementation allows a single weight assigned to each source. In other example implementations, different weights may also be assigned to traffic between various source and destination pairs. For example source node A may need to receive 10% of the bandwidth of destination B among all contenders for destination B, but must also receive 50% of the bandwidth of destination C among all contenders for destination node C. In such cases, the example implementations described herein can be augmented to utilize multiple queues to store the packets transmitted by the source node before they are sent onto the NoC. Packets for different destinations may be stored in different queues, and each queue may have different weights, based upon the weight of traffic between the source and destination pair, and the weight of other pair-wise traffic flows. Each queue may maintain its own counter values, which is incremented when a packet is transmitted from the queue onto the NoC. If the counter is less than the weight of the queue the packet is tagged as normal packet. When the counter reaches the queue's weight, is the counter is reset to zero, and the packet is tagged as barrier packet. Thus, traffic flow with a higher assigned weight may transmit more normal packets between two barriers than those with lower weight.

Next, the packets from the output queues may need to be placed on the NoC via single or multiple injection channels of the local router with the connected source. The queues will contend with each other to be placed on an injection channel, therefore arbitration may need to be performed. The arbitration between the queues can be conducted in accordance with the router's arbitration logic, wherein a phase value will be kept for each injection channel. For example, when in the barrier phase, all barrier packets at the head of the queue contending for a given injection channel will be read out and transmitted on to the channel. When there are no more barrier packets left at the head of any queues contending for the injection channel, the phase is changed to the normal phase, and normal packets are transmitted on to the channel. However, one may implement other forms of arbitration, such as round-robin among all queues contending for a given injection channel, depending on the desired implementation.

Thus, example implementations allow tagging packets in alternative sequences, such as multiple barrier packets followed by single normal packets, or sequences in which the number of packets with various tag values can vary with time. One may also utilize more than two types of tags, depending on the desired implementation. The primary concept of the example implementations involve using some form of tagging of packets during injection into the NoC, and later utilizing these tags to switch arbitration phases, and arbitration decisions at various routers in the NoC with the goal of achieving end-to-end Quality of Service or fair allocation of various resource's bandwidths among various sources. The router arbitration phase and arbitration logic can be kept completely local within the router, which provides a high degree of scalability. End-to-end fairness in large NoC interconnect networks can be implemented at low cost without degradation in performance.

Figure 9:
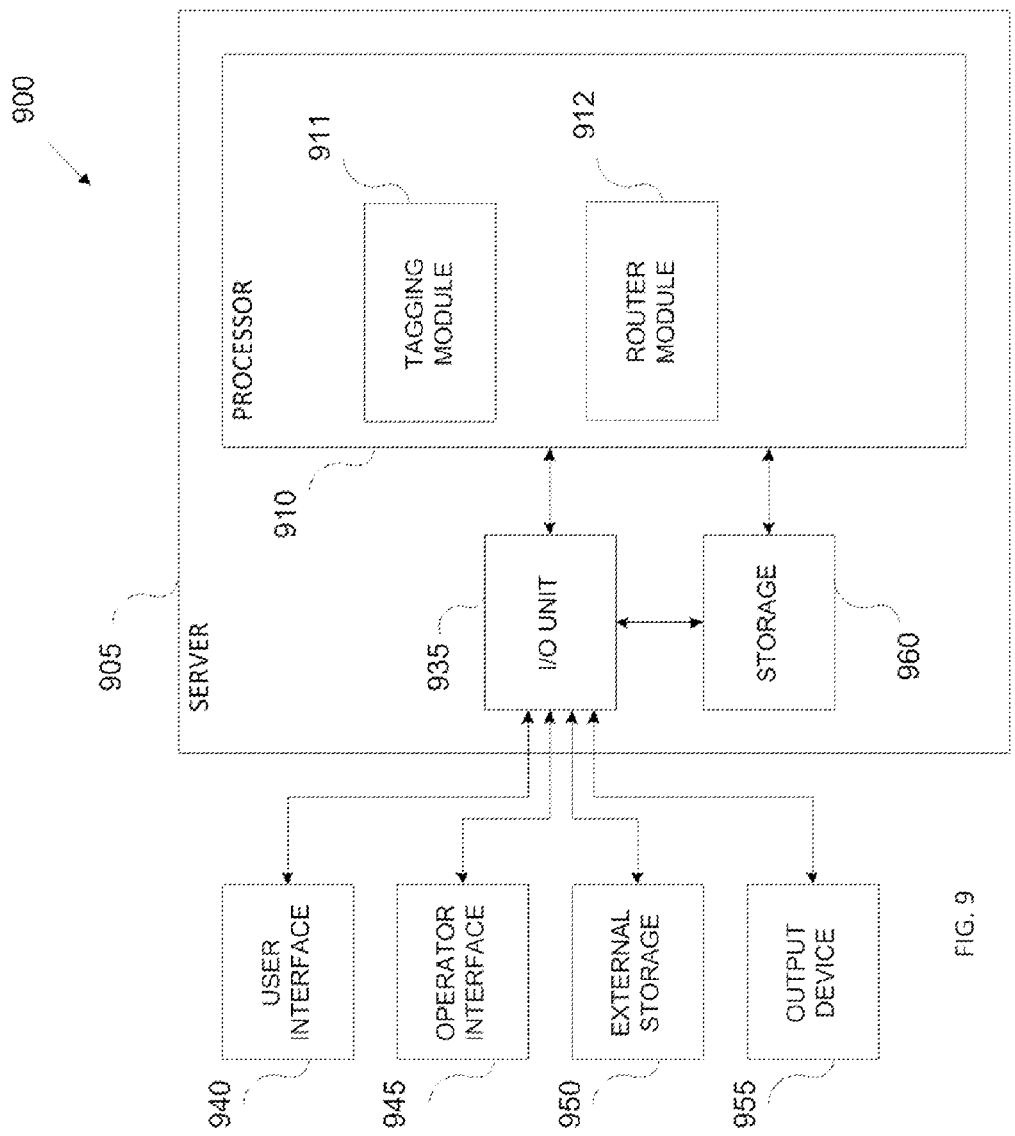
FIG. 9 illustrates a computer/server block diagram upon which the example implementations described herein may be implemented.

FIG. 9 illustrates an example computer system 900 on which example implementations may be implemented. The computer system 900 includes a server 905 which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 940 and operator interfaces 945 which may utilize input devices such as a keyboard, mouse, touch device, or verbal command.

The server 905 may also be connected to an external storage 950, which can contain removable storage such as a portable hard drive, optical media (CD or DVD), disk media or any other medium from which a computer can read executable code. The server may also be connected an output device 955, such as a display to output data and other information to a user, as well as request additional information from a user. The connections from the server 905 to the user interface 940, the operator interface 945, the external storage 950, and the output device 955 may via wireless protocols, such as the 802.11 standards, Bluetooth® or cellular protocols, or via physical transmission media, such as cables or fiber optics. The output device 955 may therefore further act as an input device for interacting with a user.

The processor 910 may execute one or more modules. The tagging module 911 may be configured to associate a tag with one or more packets of at least one input channel of a network on chip (NoC). The tag may include information for one or more arbitration decisions. The width adjustment module 911 may be further configured to determine the maximum flow of the each of the plurality of channels from an application of a maximum flow algorithm on a graph of data traffic of the plurality of channels. The tagging module 911 may be further configured to associate the tag with the one or more packets of the NoC interconnect based on one or more fairness requirements.

The router module 912 may be configured to construct a router or handle operations of a NoC, which may include reading the information of the tag and conducting an arbitration of the one or more packets for an output channel based on the reading of the information. The information for one or more arbitration decisions may an indication of one of a normal packet and a barrier packet, and wherein the conducting an arbitration may involve setting the output channel to one of a normal phase and a barrier phase. The router module 912 may also adjust the bandwidth of one or more output channels based on traffic flows of source and destination pairs of the NoC.

Figure 10:
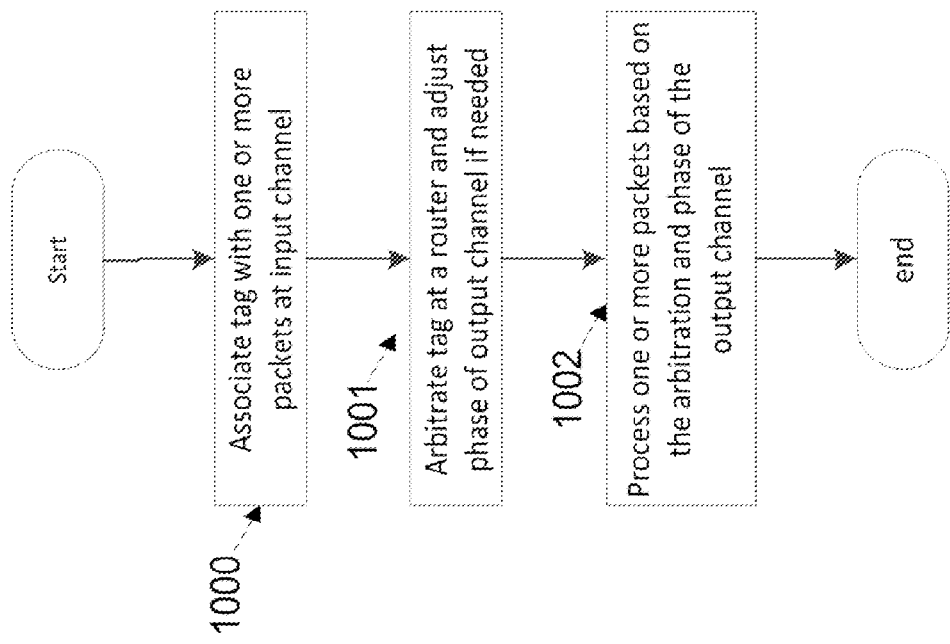
FIG. 10 illustrates a flow diagram in accordance with an example implementation.

FIG. 10 illustrates a flow diagram in accordance with an example implementation. At 1000, a tag may be associated with one or more packets at one or more input channels. At 1001 the tag may then be read (e.g. by a router), wherein tag arbitration is conducted to adjust the phase of the output channel. Based on the information for one or more arbitration decisions (e.g. an indication of one of a normal packet and a barrier packet), arbitration may be conducted by setting the output channel to one of a normal phase and a barrier phase. At 1002, the one or more packets may then be processed based on the arbitration and phase of the output channel.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
    associating a tag with one or more packets of at least one input channel of a network on chip (NoC), the tag comprising information for one or more arbitration decisions, each of the one or more packets comprising routing information;
    reading the information of the tag; and
    conducting an arbitration of the one or more packets for an output channel based on the reading of the information for ones of the packets having routing information that share a same output channel;
    wherein the information for one or more arbitration decisions is an indication of one of a normal packet and a barrier packet, and wherein the conducting the arbitration comprises:
        setting the output channel to one of a normal phase and a barrier phase;
        for the output channel set to the barrier phase, allowing only ones of the one or more packets having routing information indicative of the barrier packet to be sent on the output channel;
        for the output channel set to the normal phase, allowing only ones of the one or more packets having routing information indicative of the normal packet to be sent on the output channel.

2. The method of claim 1, wherein the reading and conducting is performed by a router of the NoC.

3. The method of claim 1, further comprising changing the setting of the output channel based on the tag of subsequently received ones of the one or more packets of the at least one input channel.

4. The method of claim 1, wherein the associating the tag with the one or more packets of the NoC interconnect is based on one or more fairness requirements.

5. The method of claim 1, wherein the associating the tag with the one or more packets of the NoC interconnect is based on an assignment of a weight.

6. The method of claim 1, wherein the associating the tag is conducted when the one or more packets enters the at least one input channel, and wherein a fairness solution is derived to adjust bandwidth of multiple ones of the at least one input channel.

7. The method of claim 6, wherein the adjusting the bandwidth is based on traffic flows of source and destination pairs of the NoC.

8. A non-transitory computer readable storage medium storing instructions for executing a process, the instructions comprising:
    associating a tag with one or more packets of at least one input channel of a network on chip (NoC), the tag comprising information for one or more arbitration decisions, each of the one or more packets comprising routing information;
    reading the information of the tag; and
    conducting an arbitration of the one or more packets for an output channel based on the reading of the information for ones of the packets having routing information that share a same output channel;
    wherein the information for one or more arbitration decisions is an indication of one of a normal packet and a barrier packet, and wherein the conducting the arbitration comprises:
        setting the output channel to one of a normal phase and a barrier phase;
        for the output channel set to the barrier phase, allowing only ones of the one or more packets having routing information indicative of the barrier packet to be sent on the output channel;
        for the output channel set to the normal phase, allowing only ones of the one or more packets having routing information indicative of the normal packet to be sent on the output channel.

9. The non-transitory computer readable storage medium of claim 8, wherein the associating the tag with the one or more packets of the NoC interconnect is based on one or more fairness requirements.

10. The non-transitory computer readable storage medium of claim 8, wherein the associating the tag with the one or more packets of the NoC interconnect is based on an assignment of a weight.

11. The non-transitory computer readable storage medium of claim 8, wherein the instructions further comprise changing the setting of the output channel based on the tag of subsequently received ones of the one or more packets of the at least one input channel.

12. The non-transitory computer readable storage medium of claim 8, wherein the associating the tag is conducted when the one or more packets enters the at least one input channel, and wherein a fairness solution is derived to adjust bandwidth of multiple ones of the at least one input channel.

13. The non-transitory computer readable storage of claim 12, wherein the adjusting the bandwidth is based on traffic flows of source and destination pairs of the NoC.

14. A system, comprising:
    a tagging module associating a tag with one or more packets of at least one input channel of a network on chip (NoC), the tag comprising information for one or more arbitration decisions, each of the one or more packets comprising routing information;
    and,
    a router module reading the information of the tag and conducting an arbitration of the one or more packets for an output channel based on the reading of the information for ones of the packets having routing information that share a same output channel;
    wherein the information for one or more arbitration decisions is an indication of one of a normal packet and a barrier packet, and wherein the router module is configured to conduct an arbitration by:
        setting the output channel to one of a normal phase and a barrier phase;
        for the output channel set to the barrier phase, allowing only ones of the one or more packets having routing information indicative of the barrier packet to be sent on the output channel;
        for the output channel set to the normal phase, allowing only ones of the one or more packets having routing information indicative of the normal packet to be sent on the output channel.

15. The system of claim 14, wherein the tagging module associates the tag with the one or more packets of the NoC interconnect based on one or more fairness requirements.

16. The system of claim 14, wherein the tagging module associates the tag when the one or more packets enters the at least one input channel, and wherein the tagging module derives a fairness solution for adjusting bandwidth of multiple ones of the at least one input channel.

17. The system of claim 16, wherein the router module adjusts the bandwidth based on traffic flows of source and destination pairs of the NoC.

\* \* \* \* \*